(12) United States Patent
Kalasapur et al.

(10) Patent No.: US 8,375,296 B2
(45) Date of Patent: Feb. 12, 2013

(54) REUSING STYLE SHEET ASSETS

(75) Inventors: Swaroop S. Kalasapur, Santa Clara, CA (US); Doreen Cheng, San Jose, CA (US); Henry Song, Pleasanton, CA (US); Onur Aciicmez, Santa Clara, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 226 days.

(21) Appl. No.: 12/827,538

(22) Filed: Jun. 30, 2010

(65) Prior Publication Data

US 2012/0005429 A1    Jan. 5, 2012

(51) Int. Cl.
*G06F 17/27* (2006.01)
(52) U.S. Cl. ......... 715/235; 715/234; 715/236; 715/239
(58) Field of Classification Search .......... 715/234–236, 715/239
See application file for complete search history.

(56) References Cited

U.S. PATENT DOCUMENTS

| | | | | |
|---|---|---|---|---|
| 5,226,141 | A * | 7/1993 | Esbensen | 711/171 |
| 5,897,622 | A * | 4/1999 | Blinn et al. | 705/26.81 |
| 6,049,664 | A * | 4/2000 | Dale et al. | 717/174 |
| 6,484,150 | B1 * | 11/2002 | Blinn et al. | 705/26.81 |
| 6,938,204 | B1 * | 8/2005 | Hind et al. | 715/234 |
| 7,020,839 | B1 * | 3/2006 | Hosoda | 715/234 |
| 7,062,709 | B2 * | 6/2006 | Cheung | 715/234 |
| 7,069,501 | B2 * | 6/2006 | Kunitake et al. | 715/234 |
| 7,117,429 | B2 * | 10/2006 | Vedullapalli et al. | 715/235 |
| 7,269,664 | B2 * | 9/2007 | Hutsch et al. | 709/246 |
| 7,769,773 | B1 * | 8/2010 | Doubek et al. | 707/769 |
| 7,793,220 | B1 * | 9/2010 | Liang et al. | 715/738 |
| 7,996,765 | B1 * | 8/2011 | Mitnick et al. | 715/235 |
| 2001/0018697 | A1 * | 8/2001 | Kunitake et al. | 707/517 |
| 2001/0034771 | A1 * | 10/2001 | Hutsch et al. | 709/217 |
| 2001/0052052 | A1 * | 12/2001 | Peng | 711/133 |
| 2003/0233620 | A1 * | 12/2003 | Vedullapalli et al. | 715/522 |
| 2004/0250204 | A1 * | 12/2004 | Isaacson | 715/517 |
| 2005/0097513 | A1 * | 5/2005 | Pepper et al. | 717/114 |
| 2007/0226612 | A1 * | 9/2007 | Sun | 715/526 |
| 2009/0271474 | A1 * | 10/2009 | Fu et al. | 709/202 |

OTHER PUBLICATIONS

Sivonen et al., Assembling Web Pages Using Document Trees; Mar. 4, 2004; Helsinki University of Technology, Department of Computer Science and Engineering; pp. 1-28.*

Bos et al.; Cascading Style Sheets, Level 2: CSS2 Specification; Apr. 11, 2008; W3C; pp. 1-340.*

* cited by examiner

*Primary Examiner* — Doug Hutton, Jr.
*Assistant Examiner* — Andrew Dyer
(74) *Attorney, Agent, or Firm* — Kenneth L. Sherman, Esq.; Michael Zarrabian, Esq.; Sherman & Zarrabian LLP (57) ABSTRACT

In a first embodiment of the present invention, a method is provided comprising: parsing a document, wherein the document contains at least one reference to a style sheet; for each referenced style sheet: determining if a ruleset corresponding to the referenced style sheet is contained in a first local cache; if the ruleset corresponding to the style sheet is contained in the first local cache; if the referenced style sheet is not contained in the first local cache, parsing the referenced style sheet to derive a ruleset; and applying the ruleset(s) to the document to derive a layout for displaying the document.

10 Claims, 8 Drawing Sheets

REUSING STYLE SHEET ASSETS

BACKGROUND OF THE INVENTION

1. Field of the Invention

The present invention relates to computer science. More specifically the present invention relates to reusing style sheet assets.

2. Description of the Related Art

Cascading Style Sheets (CSS) is a programming language used to describe presentation semantics of a document written in a markup language. Common markup languages include hypertext markup language (HTML), which is currently the most popular language used to create web pages. Other example markup languages include Extensible Markup Language (XML) and HTML5.

The most common usage of CSS is to style web pages, although the style sheets can be applied to any document. CSS may be used to enable the separation of document content from document presentation, including elements such as the layout, color, and fonts. This separation often improves content accessibility, provides more flexibility and control in the specification of presentation characteristics, enables multiple pages to share formatting, and reduce complexity of the content by reducing repetition. CSS can also allow the same document to be presented in different styles for different rendering methods, such as on-screen, in print, by voice, etc.

When utilizing CSS, a web page may contain references to one or more CSS sources (files). During the process of displaying the web page, the processing entity (such as a web browser) retrieves the linked CSS files, extracts the style rules specified in the CSS files, and applies those rules to various places within the web document being displayed.

There are various ways in which a CSS style sheet can be included into a web page. The first is through a <LINK> tag within the <HEAD> section of the HTML document. For example:

```
<HEAD>
  <LINK REL= "STYLESHEET" type="text/css" href=
  http://www.example.com/style1.css>
  ...
</HEAD>
```

Another way to include a CSS style sheet into a web page is through an "@import" statement within a <STYLE> element. For example:

```
<!--
  @import url(http://www.example.com/style2.css);
-->
</STYLE>
```

At the time of displaying a web page, the web browser (or other document processing program) performs the function of combining the style rules specified within CSS files and applying such rules to appropriate elements within the page being displayed. This process is performed separately for each page. This process can take up valuable computing power, which is especially critical as the devices running web pages become smaller and smaller (such as mobile phones), and have less CPU and battery power to spare for such operations.

While this process can be streamlined a bit by storing CSS style sheets in a cache as they are downloaded, negating the need to re-download CSS style sheets that are being reused, this solution helps largely with network bandwidth issues, and does not affect CPU or battery power issues, as the CSS style sheet must still be processed for each web page, regardless of where it is located.

What is needed is a solution that helps reduce CPU and battery power utilized to process CSS style sheets.

SUMMARY OF THE INVENTION

In a first embodiment of the present invention, a method is provided comprising: parsing a document, wherein the document contains at least one reference to a style sheet; for each referenced style sheet: determining if a ruleset corresponding to the referenced style sheet is contained in a first local cache; if the ruleset corresponding to the style sheet is contained in the first local cache, retrieving the ruleset corresponding to the style sheet from the first local cache; and if the referenced style sheet is not contained in the first local cache, parsing the referenced style sheet to derive a ruleset; and applying the ruleset(s) to the document to derive a layout for displaying the document.

In a second embodiment of the present invention, a method for operating a browser is provided, comprising: receiving a document at a document parser; parsing the document using the document parser to identify a style sheet referenced in the document; sending a request to a network module with the identification of the style sheet; determining, at the network module, whether the style sheet is contained in a local cache; at the network module, if the style sheet is contained in the local cache: retrieving the style sheet from the local cache; sending the style sheet to a style sheet parser; determining if a ruleset corresponding to the style sheet is contained in the local cache; if the ruleset corresponding to the style sheet is contained in the local cache: retrieving the ruleset from the local cache; and sending the ruleset to the style sheet parser; at the style sheet parser: if the ruleset was contained in the local cache, using the ruleset in lieu of parsing the style sheet; if the ruleset was not contained in the local cache: parsing the style sheet into a parsed ruleset; and sending the parsed ruleset to the network module for storage in the local cache.

In a third embodiment of the present invention, a web browser is provided comprising: a hypertext markup language (HTML) parser; a cascading style sheet (CSS) module; a network module; a local cache; wherein the HTML parser is configured to receive a web page, parse the web page to determine at least one style sheet referenced in the web page, and send a request for the style sheet to the network module; wherein the network module is configured to: determine whether the style sheet is contained in a local cache; if the style sheet is contained in the local cache: retrieve the style sheet from the local cache; send the style sheet to the CSS module; determine if a ruleset corresponding to the style sheet is contained in the local cache; if the ruleset corresponding to the style sheet is contained in the local cache: retrieve the ruleset from the local cache; and send the ruleset to the CSS module; wherein the CSS module is configured to: if the ruleset was contained in the local cache, use the ruleset in lieu of parsing the style sheet; if the ruleset was not contained in the local cache: parse the style sheet into a parsed ruleset; and send the parsed ruleset to the network module for storage in the local cache.

In a fourth embodiment of the present invention, an apparatus is provided, comprising: means for parsing a document, wherein the document contains at least one reference to a style sheet; means for, for each referenced style sheet: determining if a ruleset corresponding to the referenced style sheet is contained in a first local cache; if the ruleset corresponding to the style sheet is contained in the first local cache, retrieving the ruleset corresponding to the style sheet from the first local cache; and if the referenced style sheet is not contained in the first local cache, parsing the referenced style sheet to derive a ruleset; and means for applying the ruleset(s) to the document to derive a layout for displaying the document.

In a fifth embodiment of the present invention, a program storage device readable by a machine tangibly embodying a program of instructions executable by the machine is provided to perform a method comprising: parsing a document, wherein the document contains at least one reference to a style sheet; for each referenced style sheet: determining if a ruleset corresponding to the referenced style sheet is contained in a first local cache; if the ruleset corresponding to the style sheet is contained in the first local cache, retrieving the ruleset corresponding to the style sheet from the first local cache; if the referenced style sheet is not contained in the first local cache, parsing the referenced style sheet to derive a ruleset; and applying the ruleset(s) to the document to derive a layout for displaying the document.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

The present invention involves storing processed style sheet rules in a cache for reuse with subsequently processed web pages. Various mechanisms to permit the storage and access of these style sheet rules are provided. Through use of this unique caching mechanism, the processing of web pages or other documents containing references to style sheets can be performed must faster, reducing CPU and battery power utilized for such processing.

Web browsers typically accomplish CSS related tasks by first parsing the HTML source and constructing a Document Object Model (DOM) tree for the web page being visited. A DOM tree is a construct containing the tags of a web page as the nodes. The details of how a DOM tree is constructed are not critical to the present invention, and hence will not be discussed in this disclosure. It is enough to know that the web browser parses the web page into a DOM tree.

While the DOM tree is being constructed, when a reference to a style sheet is encountered, a network request is generated to download the style sheet file from its indicated location. Once the style sheet file is downloaded from the network, it is made available to the browser. The browser, when ready to apply styles to the web page, will parse the CSS file to construct rules based on the text specified within the CSS source files. While it is possible to specify complex rules within the CSS file, during the process of parsing, the extract rules are expanded from their specification format so that they are ready to be applied to the web page. The web browser then inspects the applicable rules for each node in the DOM tree and marks the appropriate fields within the corresponding nodes.

As discussed earlier, it is possible to keep all the downloaded CSS files (and other files, such as images) in a local cache, so that subsequent requests to the same resource need not be downloaded over the network.

Figure 1:
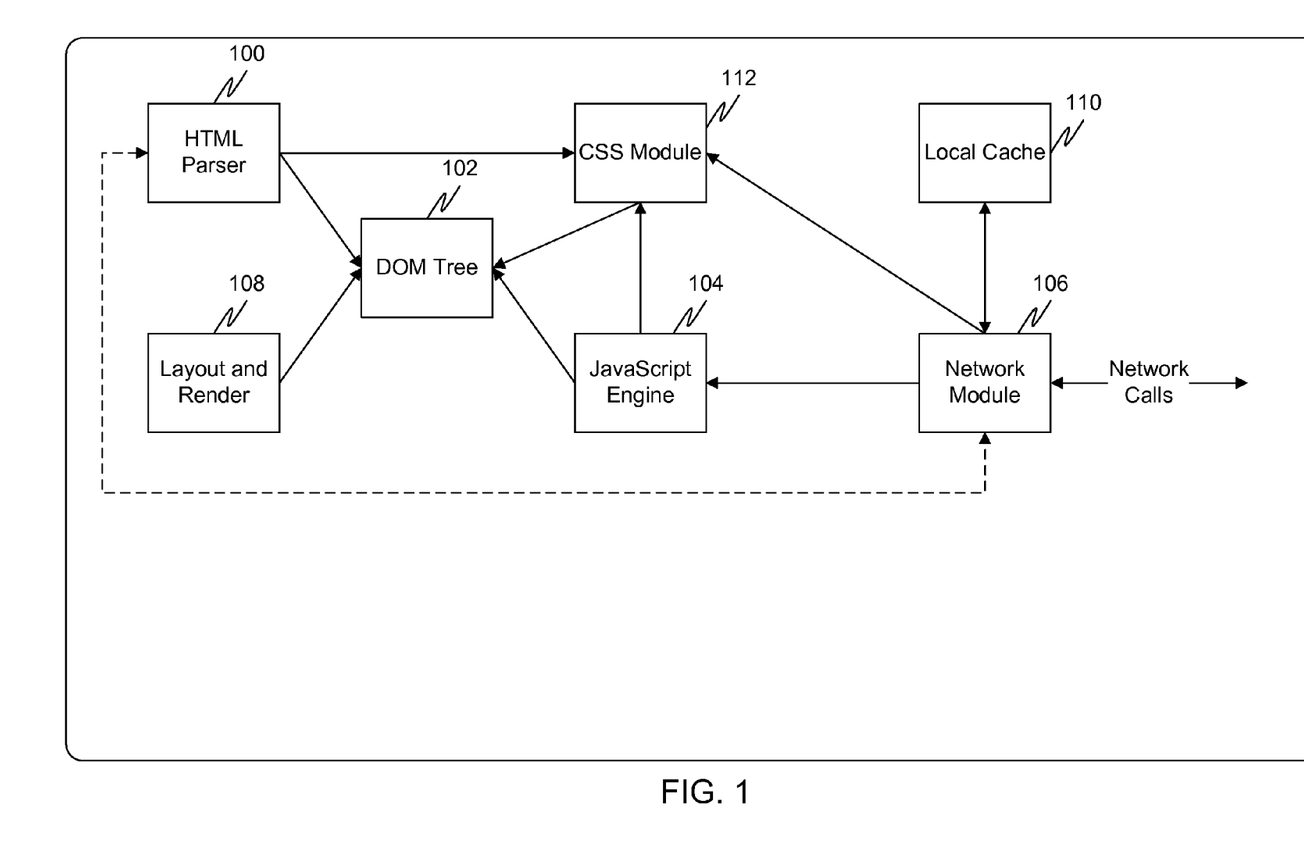
FIG. 1 is a diagram illustrating the components within a web browser.

FIG. 1 is a diagram illustrating the components within a web browser. In the figure, the lines indicate the interactions between the modules and the arrows indicate the direction of control and data flow. The solid lines represent synchronous interactions and the dashed lines represent asynchronous interactions.

An HTML parser 100 receives an HTML page as a result of a user request. The job of the HTML parser is to look at the data, identify the structure of the web page, construct the DOM tree 102, and invoke appropriate modules, such as a JavaScript engine 104. The HTML parser 100 is also responsible for identifying inline style related information (i.e., specified directly within the HTML source and not from a referenced style sheet). It parses such specifications and stores the appropriate information within the DOM tree. When a parser encounters references to external style sheets, it summons the help of a network module 106 to retrieve the appropriate resource, which will be described in more detail later.

The JavaScript engine 104 handles any scripts that are associated with a web page. The JavaScript engine 104 may be summoned by the HTML parser 100, as described above, or it may be summoned as a result of various other events, such as timer events and user generated events (keyboard press, mouse click, etc.). The JavaScript engine 104 can affect the DOM tree 102 by modifying the structure of the DOM tree 102, modifying the style rules of the DOM nodes, etc.

Layout and render modules 108 are responsible for computing the positional attributes for the web page to be displayed. Based on the structure of the DOM tree 102 and the associated style specifications, the layout and rendering modules construct a map for displaying the web page and relay the information to the entity responsible for drawing such information on the screen.

The primary responsibility of the network module 106 is to fetch requested resources from the network. These resources include the HTML source itself, referred CSS files, JavaScript sources, images, etc. When a request arrives at the network module 106, it first consults a local cache 110 to see if the resource was recently fetched and is already available in the cache 110. Based on a pre-defined policy, if it is sufficient to supply the requested resource from the cache, no new attempt is made to fetch the resource over the network. Similarly, when a new resource it fetched, it is optionally stored in the cache 110 for future use. Placing resources in the cache helps in reducing network communication overhead.

A CSS module 112 is responsible for extracting style rules specified through CSS files, and applying the extracted rules to the DOM tree 102. The CSS module can be initiated when the network module 106 indicates that a CSS file has been downloaded and is ready for parsing. A web page can employ multiple style sheet files and borrow various rules from such files for specific elements within the DOM tree 102. The CSS module is responsible for (a) parsing the source style sheet files and extracting the rules, (b) resolving any conflicts, such as multiple rules being eligible for a single element, and (c0 associating appropriate attributes to DOM nodes, based on applicable rules.

It should be noted that, while not pictured, each of these components can be located in software or hardware, and the steps associated with the components can be performed by a processor operating on a computing device, such as a personal computer, laptop computer, mobile phone, set-top box, etc.

Figure 2:
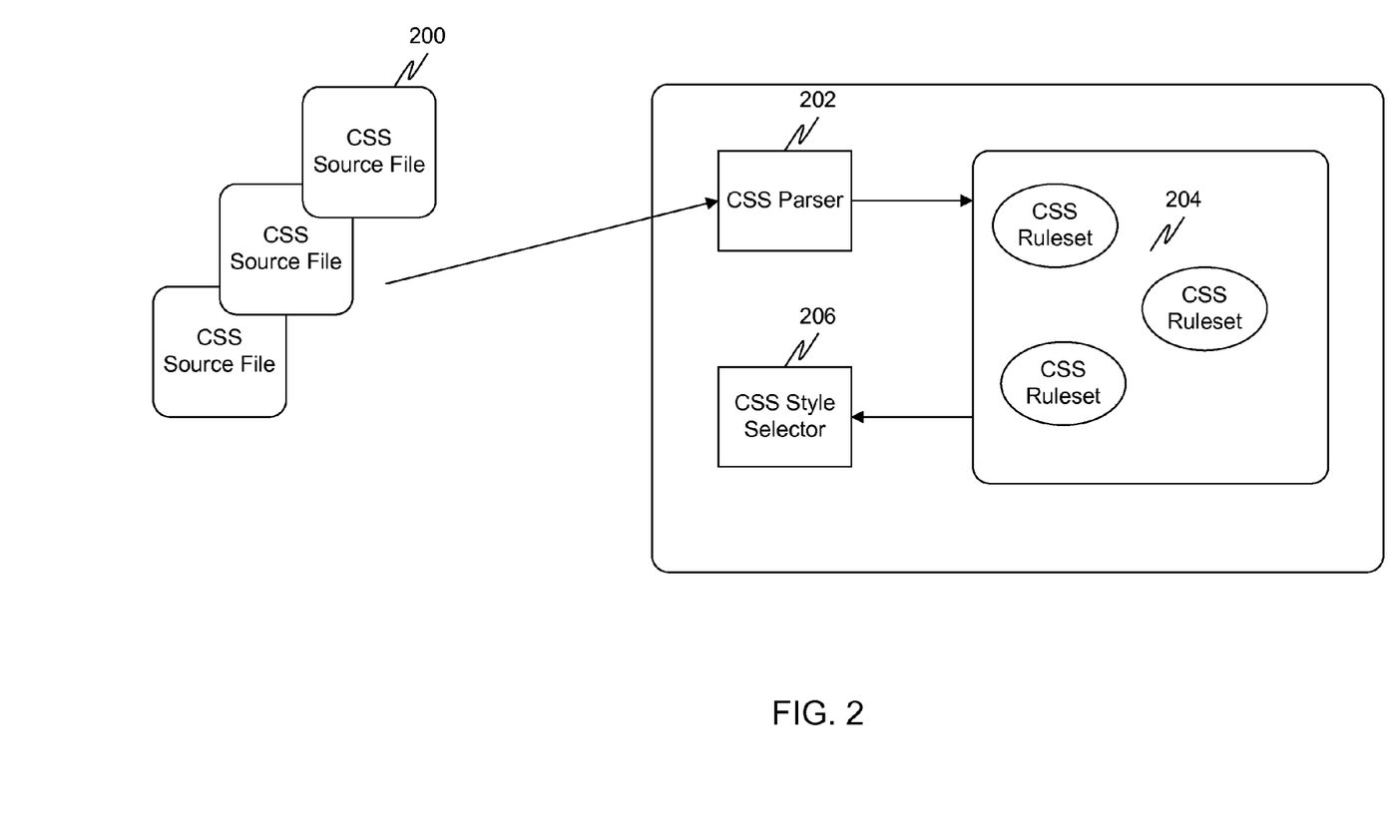
FIG. 2 is a diagram illustrating functional blocks of a CSS module.

FIG. 2 is a diagram illustrating functional blocks of a CSS module. When a CSS source file 200 file is ready for processing (after it is downloaded, or if it is already available in the cache), the CSS module is invoked to extract the specified style rules. Typically, the CSS module employs a CSS parser 202 that is equipped to look at the raw source within the files and construct rulesets 204, which are essentially data structures that can later be utilized to match an applicable rule against a given DOM node. During such ruleset construction, the CSS module maintains the knowledge of the original source of the constructed ruleset by retaining the uniform resource locator (URL) information, since such information will be necessary during the process of the style resolution.

When it is time to apply the extracted rules to the DOM nodes, the CSS style selector 206 is used to identify all rules that are applicable to a particular node. The CSS selector has the capability to identify applicable rules based on various factors such as the tag-name, class, or ID of the corresponding element. The CSS style selector 206 is also capable of resolving conflicts among multiple applicable rules, by computing a "specificity" for each rule.

Typically, when a user traverses from one web page to another, all computed ruleset data structures are discarded, and the browser starts creating and computing new data structures based on the procedures described above, even I there are no changes in the style specifications. In an embodiment of the present invention, possibilities for re-using such computed style rulesets are identified and a mechanism for re-using the computing style rules is provided.

In an embodiment of the present invention, two mechanisms are provided. The first is a mechanism to retain parsed rules for a style sheet, for later use by any document that includes the same style sheet. The second is a mechanism to reuse the computed rules for a previously used style sheet file, avoiding reparsing of the same file. This embodiment of the present invention essentially enables extensions to webpage caching schemes by incorporating the computed style rules to be included in the cache.

It should be noted that while the present disclosure describes the application of the invention to web pages or web documents, it is not necessary for such documents to be displayed or downloaded from the Internet. The invention may be applied to any document that references style sheets. Likewise, while the present disclosure describes the use of a web browser, the invention may be applied to any program that processes documents having referenced style sheets. As such, nothing in this disclosure should be interpreted as limiting the scope of the invention to web documents and/or web browsers.

Figure 3:
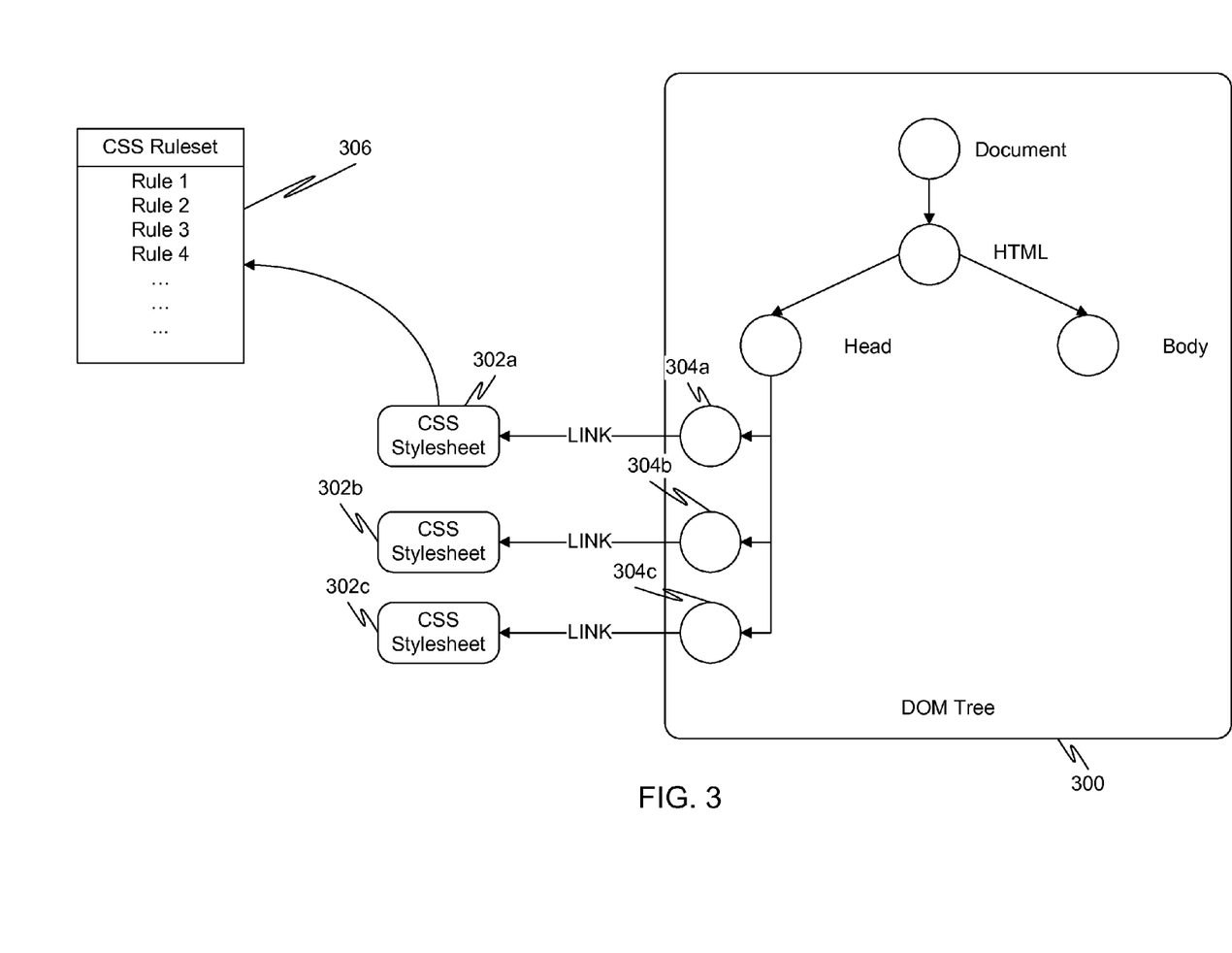
FIG. 3 is a diagram illustrating style-related data structures within a web browser.

FIG. 3 is a diagram illustrating style-related data structures within a web browser. The DOM tree 300 contains a number of nodes. Notably, this figure is only showing CSS related data structures, and is not a complete representation of a DOM tree. Each external CSS file 302a-302c that is employed in the web page has a corresponding data structure within the DOM tree (LINK nodes 304a-304c, respectively). Additional data structures containing the parsed CSS ruleset 306 are also created.

Figure 4A:
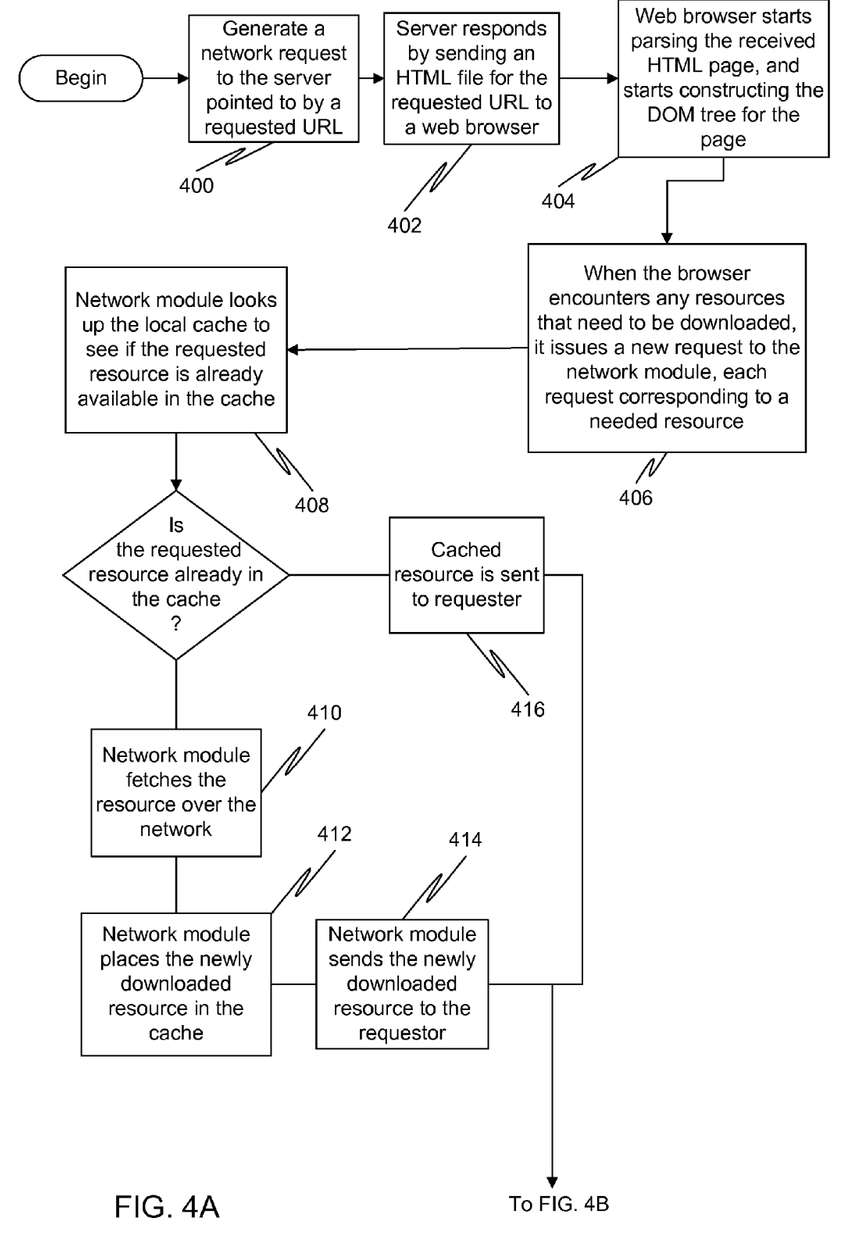
FIGS. 4A and 4B are a flow diagram illustrating a method for reusing parsed CSS rules in accordance with an embodiment of the present invention.
Figure 4B:
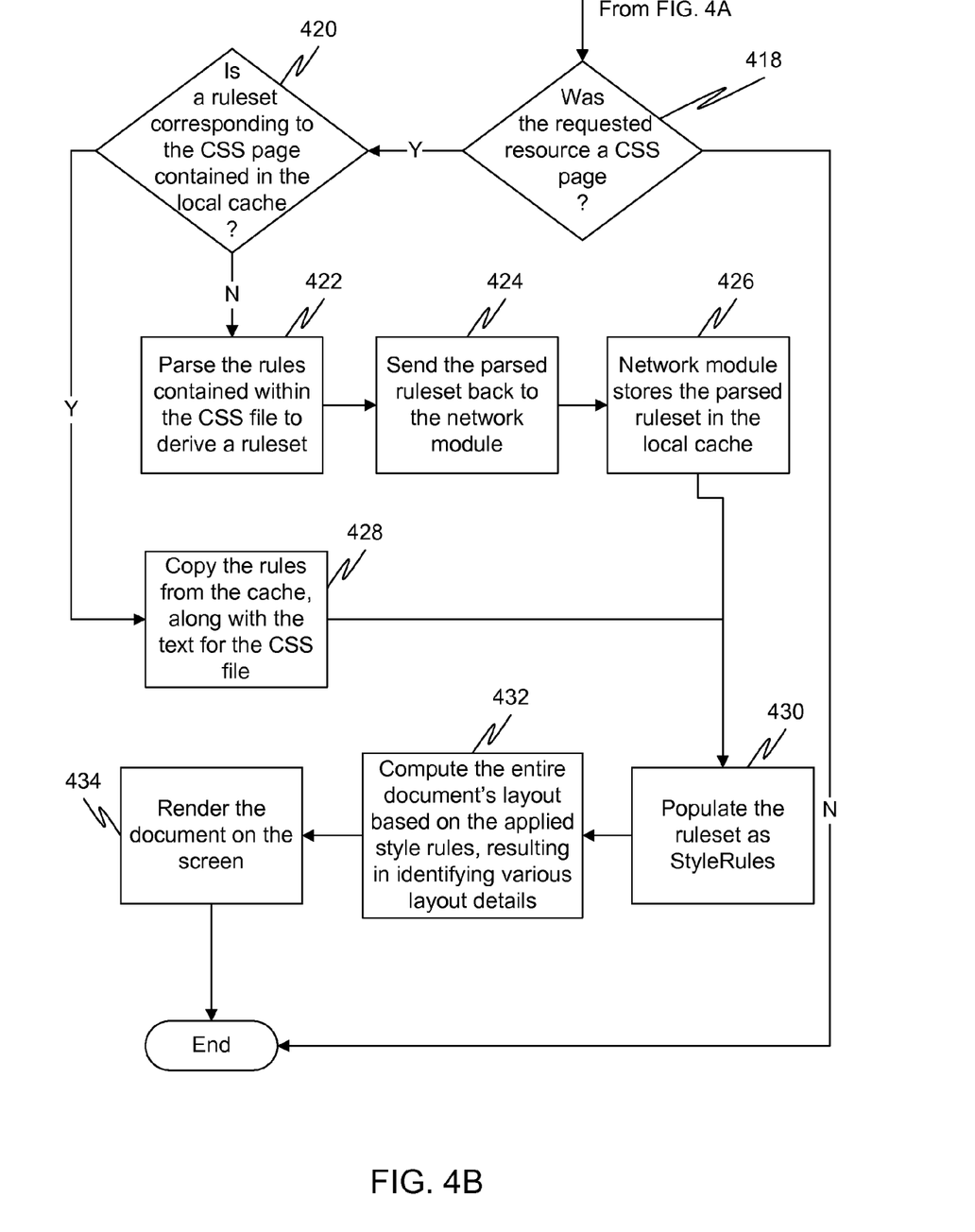

FIGS. 4A-4B are a flow diagram illustrating a method for reusing parsed CSS rules in accordance with an embodiment of the present invention. At 400, a network request is generated to the server pointed to by a requested URL. At 402, the server responds to the request by sending an HTML file for the requested URL to a web browser. At 404, the web browser starts parsing the received HTML page, and starts constructing the DOM tree for the page. At 406, when the browser encounters any resources that need to be downloaded, such as images, JavaScript source files, CSS files, etc., it issues a new request to the network module, each request corresponding to a needed resource. At 408, the network module looks up the local cache to see if the requested resource is already available in the cache. If not, then at 410 the network module fetches the resource over the network. At 412, the network module places the newly downloaded resource in the cache. Then at 414, the network module sends the newly downloaded resource to the requestor. If at 408 the requested resource was already available in the cache, then at 416 the cached resource is sent to the requestor.

Referring to FIG. 4B, at 418, it is determined if the requested resource was a CSS page. If so, then at 420 it is determined if a ruleset corresponding to the CSS page is contained in the local cache. It should be noted that in some embodiments the CSS pages (and other downloaded resources) are stored in the same cache as the rulesets, but in other embodiments the rulesets may be stored in a separate cache. For simplicity, the figure will only describe the embodiment wherein there is a single cache. However, the claims shall be construed broadly enough to cover both cases, unless expressly stated.

If the ruleset is not contained in the local cache, then at 422 the rules contained within the CSS file are parsed to derive a ruleset. At 424, the parsed ruleset is sent back to the network module. At 426, the network module stores the parsed ruleset in the local cache.

If, on the other hand, the ruleset was already contained in the local cache, then at 428 the rules are copied from the cache, along with the text for the CSS file (which may be required for processing later), thus avoiding the need to re-parse the style sheet.

Once a rulesheet is obtained for the CSS file, either by retrieving from the cache or by parsing the CSS file, at 430 the ruleset is populated as StyleRules, which can then be used to provide style to the document. When the StyleRules are prepared by the CSS parser, the rules are inspected against each node with the DOM tree to identify which rules are applicable to the element under inspection, and appropriate values are copied over to the DOM node. At 432, based on the applied style rules, the entire document's layout is computed, resulting in identifying various details such as the position and size attributes of each element, font details for the text elements, color, etc. At 434, the document is then rendered on the screen.

Figure 5:
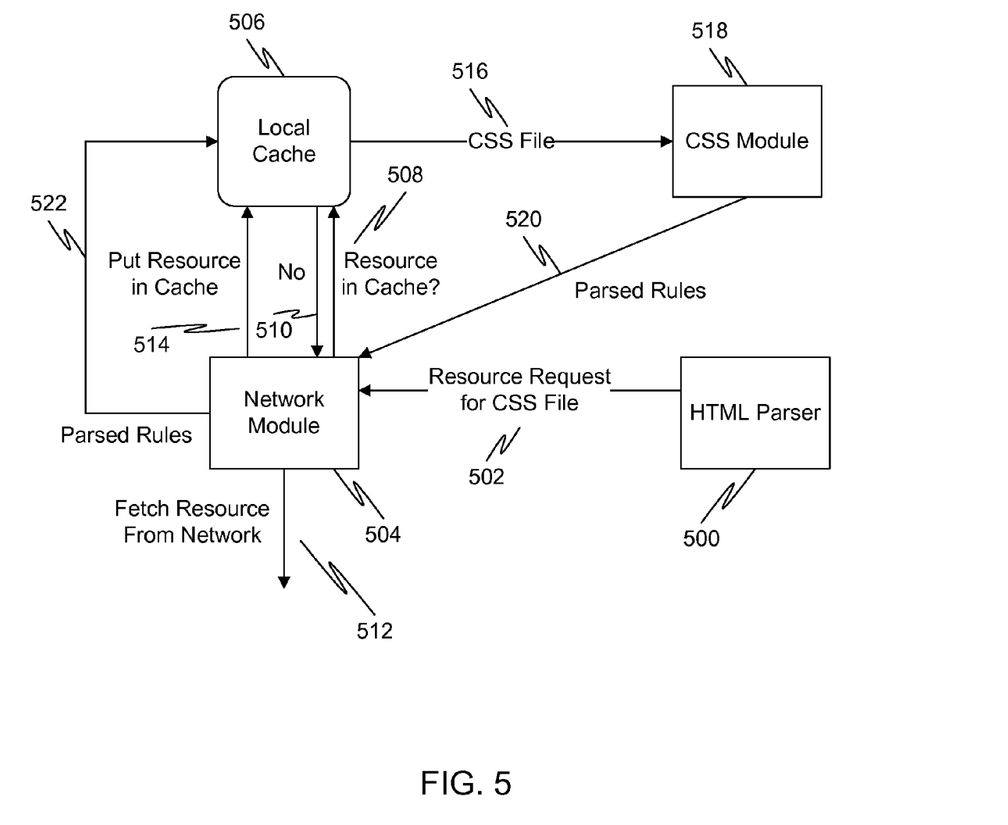
FIG. 5 is another diagram illustrating a procedure in accordance with the present invention.

FIG. 5 is another diagram illustrating a procedure in accordance with the present invention. Here, the procedure for obtaining a CSS file that is not in the cache is depicted as a system process diagram. The HTML parser 500 places a resource request for a CSS file 502 at the network module 504. The network module 504 checks the local cache 506 and finds that the resource is not available (the check is depicted at 508, with the negative response at 510). The network module 504 then fetches 512 the resource over the network. The network module 504 then places the fetched resource 514 in the local cache 506. The CSS file 516 is then sent from the local cache 506 to the CSS module 518. The CSS module 518 then parses the CSS file to extract rules, which are sent back 520 to the network module 504 for storage in the local cache 506, process 522.

Figure 6:
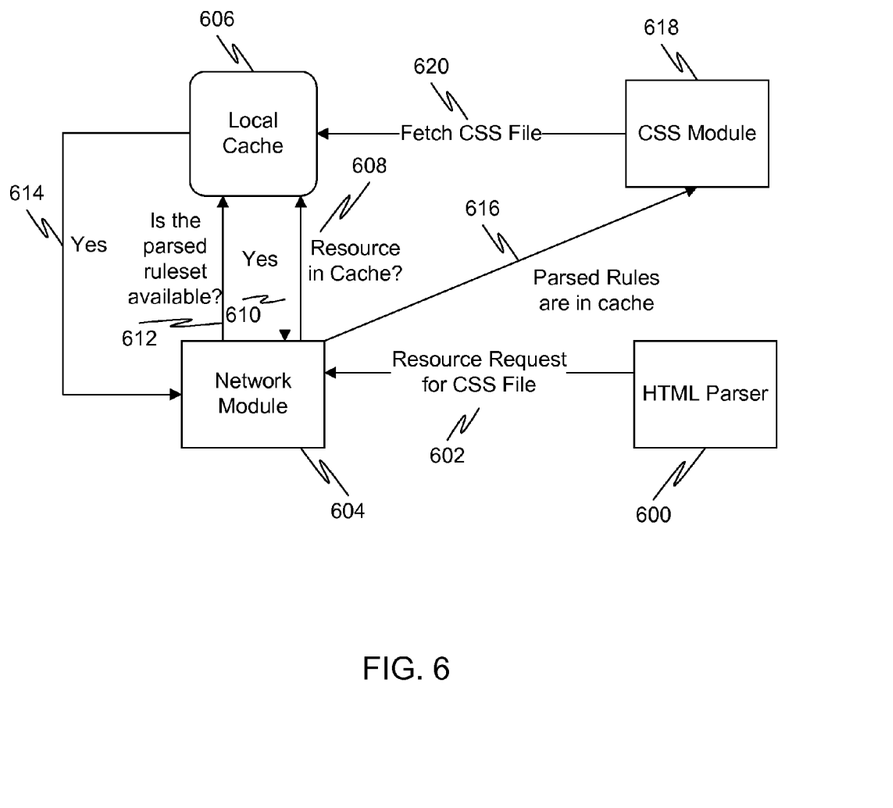
FIG. 6 is another diagram illustrating a similar procedure to FIG. 5, except where the CSS file is already available in the cache.

FIG. 6 is another diagram illustrating a similar procedure to FIG. 5, except where the CSS file is already available in the cache. The HTML parser 600 places a resource request for the CSS file 602 at the network module 604. The network module 604 checks the local cache 606 and finds that the resource is available (the check is depicted at 608, and the positive response at 610). Since the response was positive, the network module checks the local cache 606 to determine if the parsed ruleset is available (the check is depicted at 612 and the positive response at 614). Since this response was also positive, the network module 604 informs the CSS parser 616 that the parsed ruleset is already available in the cache at process 618. The CSS parser then fetches 620 the parsed ruleset from the local cache 606, thus skipping the process of parsing the CSS file.

There are also various optional alternative embodiments of the present invention. In one embodiment, a smart cache is utilized. Specifically, the system can determine how large a ruleset is. Parsing time to create a ruleset is proportional to the size of the ruleset being created. Therefore, if space in the cache is somewhat limited, it may be beneficial to limit the rulesets stored in the cache to larger rulesets. As such, a predetermined threshold can be determined and rulesets larger than the predetermined threshold can be stored in the cache, while rulesets smaller than the predetermined threshold can be discarded after use.

The smart cache can also act dynamically to alter the predetermined threshold based on the size and/or available room in the cache. Therefore, the larger the cache, or the greater the amount of available space, the smaller the predetermined threshold, allowing more rulesets to be stored in the cache to take advantage of the room.

Figure 7:
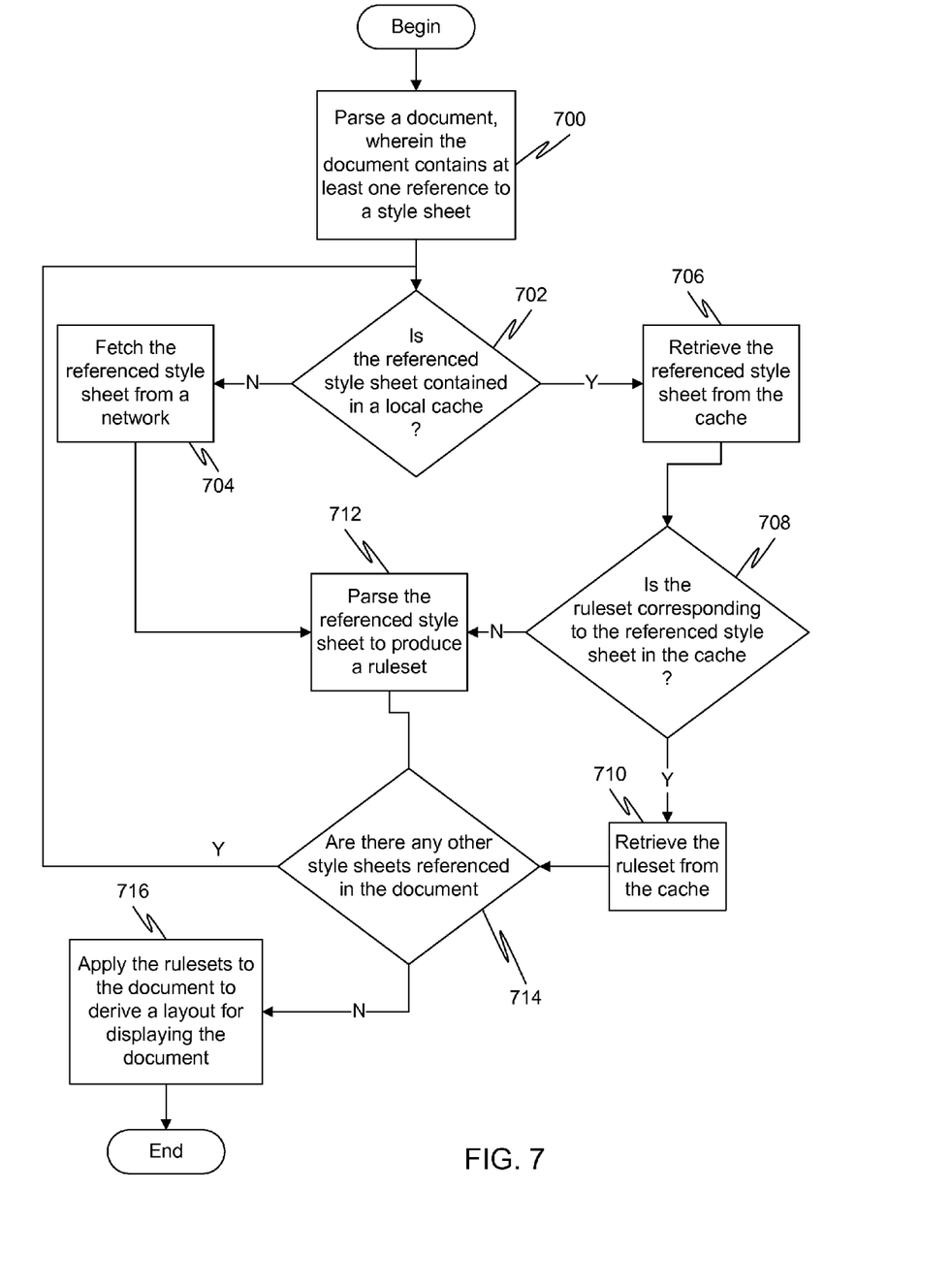
FIG. 7 is a flow diagram illustrating a method in accordance with an embodiment of the present invention.

FIG. 7 is a flow diagram illustrating a method in accordance with an embodiment of the present invention. At 700, a document is parsed, wherein the document contains at least one reference to a style sheet. The document may be, for example, a web page such an HTML file. The style sheet may be, for example, a CSS style sheet. The remaining steps are performed for each referenced style sheet in the document. At 702, it is determined if the referenced style sheet is contained in a local cache. If not, then at 704 the referenced style sheet is fetched from a network. If this occurs, it may be assumed that the ruleset for the style sheet also is not contained in the cache, so the process can proceed at this point to 714, which is described later.

If, at 702, it was determined that the referenced style sheet is contained in the local cache, then at 706 the referenced style sheet may be retrieved from the cache. At 708, it may be determined if a ruleset corresponding to the referenced style sheet is contained in the cache. If so, then at 710, then the ruleset is retrieved from the cache. The process can then proceed to 714, described later.

If, at 708, it is determined that the ruleset is not contained in the cache, then at 712 the referenced style sheet is parsed to produce a ruleset.

At 714, it is determined if there are any more referenced style sheets in the document. If so, then the process loops back up to 702 for the next referenced style sheet. If not, then at 716 the rulesets are applied to the document to derive a layout for displaying the document.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method comprising:
    parsing a web page, wherein the web page contains at least one reference to a style sheet, wherein the style sheet includes style rules to be applied to a web page during parsing;
    for each referenced style sheet:
        parsing the referenced style sheet into a ruleset, wherein the parsing includes extracting rules and expanding them from their specification format so that they are ready to be applied to the web page;
        determining if the referenced style sheet is contained in the first local cache; and
        determining if the ruleset corresponding to the referenced style sheet is contained in a first local cache, only if the referenced style sheet is contained in the first local cache;
        if the ruleset corresponding to the style sheet is contained in the first local cache, retrieving the ruleset corresponding to the style sheet from the first local cache;
        if the referenced style sheet is not contained in the first local cache, parsing the referenced style sheet to derive a ruleset; and applying the ruleset(s) to the web page to derive a layout for displaying the web page.

2. The method of claim 1, further comprising storing the ruleset in the first local cache only if the parsed ruleset is larger than a predetermined threshold.

3. The method of claim 2, wherein the predetermined threshold is dynamically altered based on the size of the first local cache.

4. The method of claim 2, wherein the predetermined threshold is dynamically altered based on available room in the first local cache.

5. An apparatus comprising:
   a processor;
   a parser for parsing a web page, wherein the web page contains at least one reference to a style sheet, wherein the style sheet includes style rules to be applied to a web page during parsing;
   a style selector for, for each referenced style sheet:
      determining if the referenced style sheet is contained in the first local cache;
      only if the referenced style sheet is contained in the first local cache, determining if the ruleset is stored in the first local cache;
      if the ruleset corresponding to the style sheet is contained in the first local cache,
      retrieving the ruleset corresponding to the style sheet from the first local cache; and
      if the referenced style sheet is not contained in the first local cache, parsing the referenced style sheet to derive a ruleset; and
      means for applying the ruleset(s) to the web page to derive a layout for displaying the web page.

6. The apparatus of claim 5, wherein the style selector is configured to store the parsed ruleset in the first local cache.

7. The apparatus of claim 5, further comprising means for storing the parsed ruleset in the first local cache only if the parsed ruleset is larger than a predetermined threshold.

8. The apparatus of claim 7, wherein the predetermined threshold is dynamically altered based on the size of the first local cache.

9. The apparatus of claim 7, wherein the predetermined threshold is dynamically altered based on available room in the first local cache.

10. A non-transitory computer readable medium tangibly embodying a program of instructions executable by the machine to perform a method comprising:
   parsing a web page, wherein the web page contains at least one reference to a style sheet, wherein the style sheet includes style rules to be applied to a web page during parsing;
   for each referenced style sheet:
      parsing the referenced style sheet into a ruleset, wherein the parsing includes extracting rules and expanding them from their specification format so that they are ready to be applied to the web page;
      determining if the referenced style sheet is contained in the first local cache;
   and
      determining if the ruleset corresponding to the referenced style sheet is contained in a first local cache, only if the referenced style sheet is contained in the first local cache;
      if the ruleset corresponding to the style sheet is contained in the first local cache, retrieving the ruleset corresponding to the style sheet from the first local cache;
      if the referenced style sheet is not contained in the first local cache, parsing the referenced style sheet to derive a ruleset; and
   applying the ruleset(s) to the web page to derive a layout for displaying the web page.

\* \* \* \* \*